March 25, 1947.  W. P. SCHMITTER ET AL  2,418,099
CLUTCH FACING
Filed March 15, 1945  2 Sheets-Sheet 1

Walter P. Schmitter
Edward J. Wellauer
INVENTORS.

BY Ralph W. Brown.

ATTORNEY.

March 25, 1947.  W. P. SCHMITTER ET AL  2,418,099
CLUTCH FACING
Filed March 15, 1945  2 Sheets-Sheet 2

Walter P. Schmitter
Edward J. Wellauer
INVENTOR.

BY
ATTORNEY.

Patented Mar. 25, 1947

2,418,099

UNITED STATES PATENT OFFICE 2,418,099

CLUTCH FACING

Walter P. Schmitter and Edward J. Wellauer, Wauwatosa, Wis., assignors to The Falk Corporation, Milwaukee, Wis., a corporation of Wisconsin Application March 15, 1945, Serial No. 582,908

1 Claim. (Cl. 192—107)

This invention relates to facings for friction clutches, brakes, and couplings of the type wherein the gripping pressures are developed by an inflatable gland of rubber or the like.

Devices of the character mentioned are today extensively used in heavy duty power transmissions such, for instances, as the reversing drive mechanism disclosed in Patent No. 2,304,031 to Walter P. Schmitter, wherein two clutches are employed alternatively operable to effect reversal. As therein indicated, each clutch gland is ordinarily protected against wear by a circular series of friction shoes applied to the face thereof and peripherally spaced to insure flexibility and to permit the peripheral contraction and expansion incident to opening and closing of the clutch.

In spite of the protection thus afforded by the friction shoes, premature gland failures have been known to occur under some conditions of use. Such failures are believed due to a burning and weakening of the gland by the lodgement thereon of hot particles that result from slippage and consequent wear and that find their way onto the gland through the spaces between the shoes.

One object of the present invention is to provide a gland energized clutch or the like having a facing so constructed and arranged as to eliminate the above difficulties.

Other more specific objects and advantages will appear, expressed or implied, from the following description of three illustrative embodiments of the present invention.

The clutch ring selected for illustration comprises the outer member of a clutch of the type disclosed in the patent hereinabove identified. It comprises a metal ring 10 and a substantially flat tubular gland 11 of rubber or the like vulcanized or otherwise surface bonded to the inner face of the ring.

Figure 1:
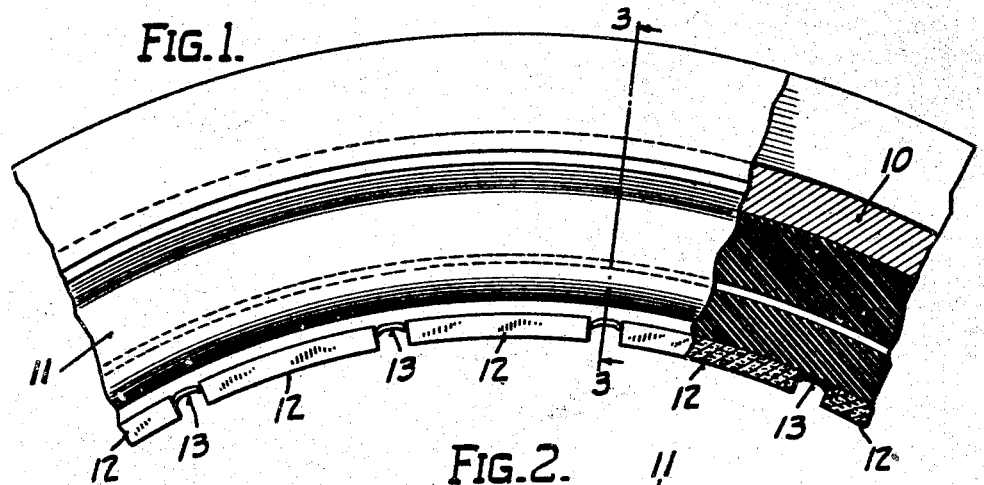
Figure 1 is a side elevation, partly in section, of a portion of a clutch ring equipped with a facing constructed in accordance with the present invention.
Figure 2:
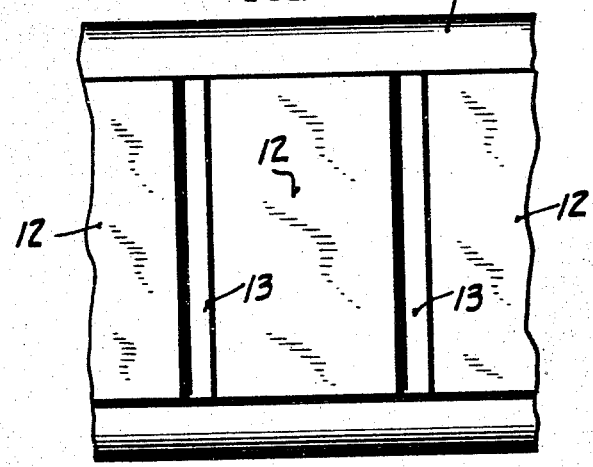
Fig. 2 is a view in elevation of a portion of the inner face of the clutch ring shown in Fig. 1.
Figure 3:
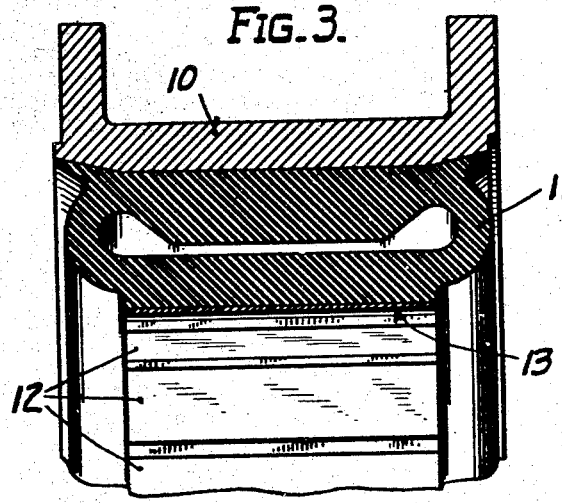
Fig. 3 is a sectional view taken substantially along the line 3—3 of Fig. 1.

In the clutch shown in Figs. 1, 2, and 3 the gland 11 carries a circular series of friction shoes 12 adapted to be pressed by the gland into frictional engagement with an inner clutch member (not shown) to thereby effect closing and opening of the clutch by inflating and deflating the gland. The shoes 12 are shown surface bonded to the inner face of the gland 11 and peripherally spaced to permit peripheral contraction and expansion during clutching and declutching actions.

In this instance those areas of the gland 11 between successive shoes 12 are covered by shields 13 preferably in the form of metal strips surface bonded to the gland. These strips protect the gland against contact with any hot worn particles that might find permanent lodgement between the shoes 12 and also serve to dissipate heat from any hot particles that might find lodgement thereon.

Figure 4:
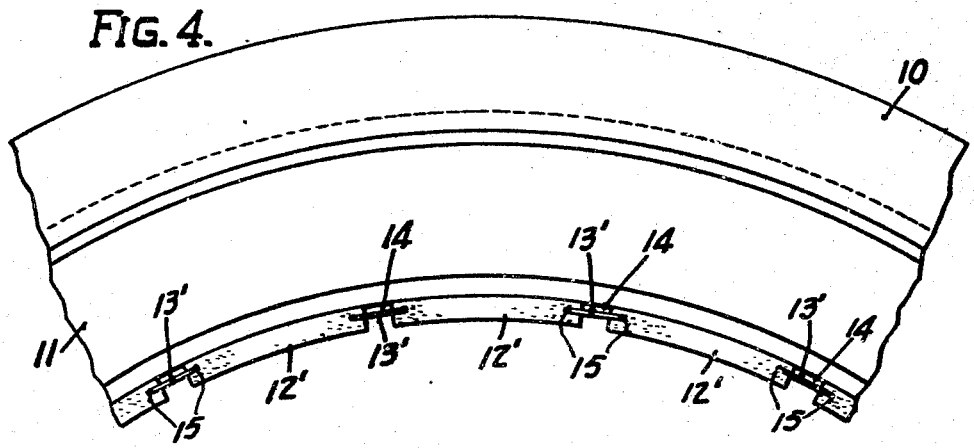
Figs. 4 and 5 are views similar to Fig. 1 of similar clutches having modified forms of facings embodying the invention.

In the clutch shown in Fig. 4 similar shields 13' are provided between successive shoes 12'. In this instance however the shields 13' are spaced from the gland 11 to form ventilating channels 14 between the shields and gland. For this purpose opposed grooves 15 are provided in the ends of adjacent shoes adapted to snugly receive and support the opposite edges of the interposed shield. The grooves 15 are of sufficient depth to permit relative advance and retraction between the shoes so not to impair the peripheral contraction and expansion of the gland face during clutching and declutching action.

Figure 5:
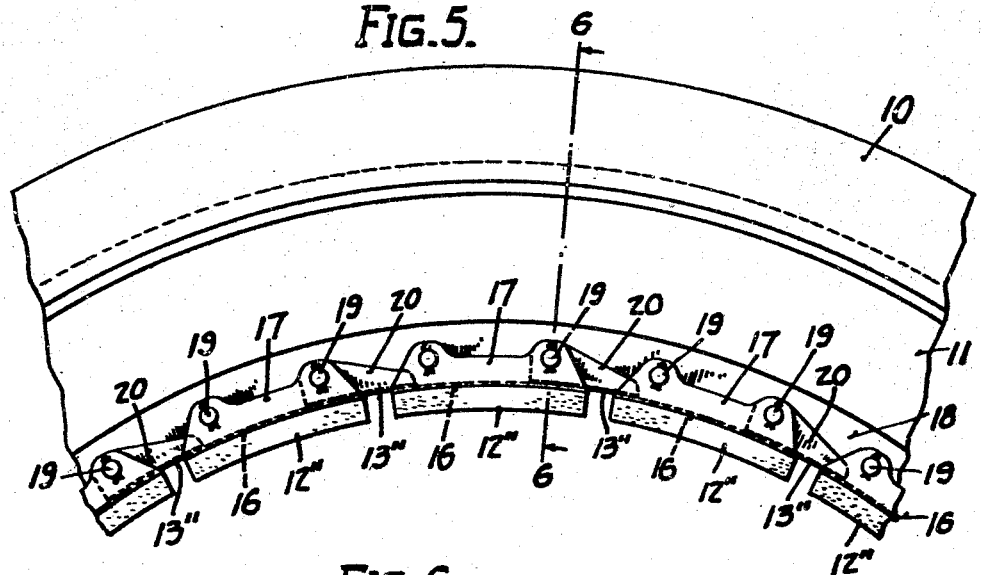
Figure 6:
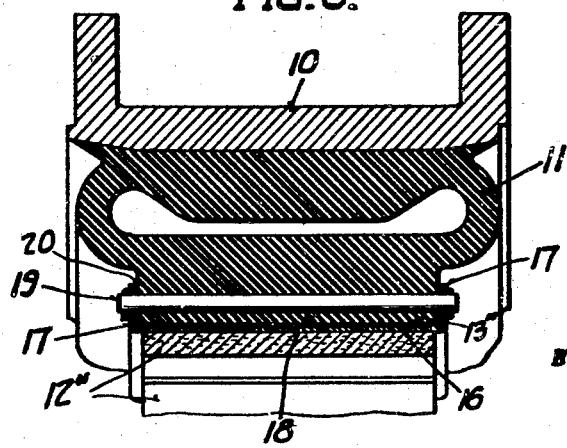
Fig. 6 is a sectional view taken substantially along the line 6—6 of Fig. 5.

In the clutch shown in Figs. 5 and 6 the several friction shoes 12" are removably attached to the gland 11, and for this purpose each is carried by a mounting plate 16 having upstanding flanges 17 adapted to embrace a thickened portion 18 provided on the face of the gland. Two pins 19 extending through the flanges 17 of each mounting plate 16 and through the gland portion 18 provide convenient means for releasably receiving each shoe to the gland.

In this instance the spaces between successive shoes 12" are bridged by shields 13" interposed between the mounting plates 16 and the face of the gland portion 18. Each shield 13" is shown locked to an adjacent mounting plate 16 by one of the pins 19 which extends through upstanding ears 20 on the opposite ends of each shield; and each shield 13" extends into overlapping relation with the next adjacent plate 16 against which it is seated and in sliding contact. The shields 13" thus protect against exposure those areas of the gland between the successive shoes 12", and at the same time permit free peripheral adjustment between shoes such as is necessary to accommodate contraction and expansion of the gland.

Various changes may be made in the invention hereinabove specifically described without departing from or sacrificing the advantages of the invention as defined in the appended claim.

We claim:

In a clutch or the like energized by an inflatable annular gland, a facing for said gland comprising a circular series of friction shoes surface bonded to a face of said gland, and a series of protective shields surface bonded to said gland face between successive shoes, each of said shields being disposed out of the plane of the friction faces of adjacent shoes and bridging the gap therebetween.

WALTER P. SCHMITTER.
EDWARD J. WELLAUER.

REFERENCES CITED

The following references are of record in the file of this patent:

UNITED STATES PATENTS

| Number | Name | Date |
| --- | --- | --- |
| 2,241,445 | Fawick | Aug. 5, 1941 |
| 2,256,431 | Hunter et al. | Sept. 16, 1941 |
| 2,311,113 | Klocke | Feb. 16, 1943 |
| 1,682,824 | Beck | Sept. 4, 1928 |
| 2,350,039 | Hollerith | May 30, 1944 |